US 6,547,187 B2

(12) United States Patent
Foster (10) Patent No.: US 6,547,187 B2
(45) Date of Patent: *Apr. 15, 2003

(54) APPARATUS AND METHOD FOR DEICING AIRCRAFT USING COMPACT, LIGHTWEIGHT AIR SOURCE

(75) Inventor: Clifton L. Foster, Kissimmee, FL (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/901,058

(22) Filed: Jul. 10, 2001

(65) Prior Publication Data

US 2002/0030141 A1 Mar. 14, 2002

Related U.S. Application Data

(63) Continuation-in-part of application No. 09/455,031, filed on Dec. 3, 1999, now abandoned, which is a continuation-in-part of application No. 09/129,533, filed on Aug. 5, 1998, now Pat. No. 6,045,092.

(51) Int. Cl.$^7$ .............................................. B64D 15/00
(52) U.S. Cl. .......................... 244/134 C; 244/134 R; 239/722
(58) Field of Search .................. 244/134 C, 134 R; 239/722

(56) References Cited

U.S. PATENT DOCUMENTS

| | | | |
|---|---|---|---|
| 3,243,123 A | 3/1966 | Inghram et al. | 239/124 |
| 3,770,062 A | 11/1973 | Riggs | 169/24 |
| 3,985,223 A | 10/1976 | Forcella et al. | 198/479 |
| 4,007,793 A | 2/1977 | Hux et al. | 169/25 |
| 4,073,437 A | 2/1978 | Thorton-Trump | 239/131 |
| 4,309,049 A | 1/1982 | Chevallier | 285/18 |
| 4,423,980 A | 1/1984 | Warnock | 404/83 |
| 4,565,321 A | 1/1986 | Vestergaard | 239/172 |
| 4,723,733 A | 2/1988 | McClinchy | 244/134 |
| 4,872,501 A | 10/1989 | Hightower | 165/1 |
| 5,028,017 A | 7/1991 | Simmons et al. | 244/134 |
| 5,096,145 A | 3/1992 | Phillips et al. | 244/134 |
| 5,104,068 A | 4/1992 | Krilla et al. | 244/134 |
| 5,134,266 A | 7/1992 | Peppard | 219/10.55 |
| 5,180,122 A | 1/1993 | Christian et al. | 244/134 |
| 5,244,168 A | 9/1993 | Williams | 244/134 |
| 5,318,254 A | 6/1994 | Shaw et al. | 244/134 |
| 5,490,646 A | 2/1996 | Shaw et al. | 244/134 |
| 5,746,396 A | 5/1998 | Thorton-Trump | 244/134 |
| 5,755,404 A | 5/1998 | Numbers | 244/134 |
| 6,045,092 A | 4/2000 | Foster | 244/134 C |
| 6,250,588 B1 | 6/2000 | Numbers et al. | 244/134 C |

OTHER PUBLICATIONS

Giroux, "Hot Air Blast System: An Alternative to Heated Glycol Deicing" (Jun. 12, 1997).

"Allied Signal's Augmented Forced–Air Deicing (AFAD)," Allied Signal Aerospace (Oct. 22, 1996).

Final Program, SAE Aircraft Ground Deicing Conference & Exposition, Jun. 11, 1997.

*Primary Examiner*—J. Woodrow Eldred
(74) *Attorney, Agent, or Firm*—Collier Shannon Scott, PLLC; Mark W. Rygiel (57) ABSTRACT

The present invention is directed to a system and method for deicing, equipment, particularly aircraft. In one embodiment, the system of the present invention may comprise a vehicle frame; a boom having a first end mounted on the vehicle frame and a free end; a lightweight air source disposed above the first end of the boom; and a deicer air jet nozzle located at the boom and operatively coupled to the air source for receiving air and discharging the air for a deicer application, wherein the lightweight air source is located proximate to the deicer air jet nozzle.

30 Claims, 8 Drawing Sheets

APPARATUS AND METHOD FOR DEICING AIRCRAFT USING COMPACT, LIGHTWEIGHT AIR SOURCE

This application is a continuation-in-part of U.S. patent application Ser. No. 09/455,031, filed on Dec. 3, 1999, which is a continuation-in-part of U.S. patent application Ser. No. 09/129,533 filed Aug. 5, 1991, now U.S. Pat. No. 6,045,092, copies of each of which are incorporated herein by reference in their entirety. This application further claims priority to U.S. patent application Ser. No. 09/392,701, now U.S. Pat. No. 6,209,823 and U.S. patent application Ser. No. 09/392,524, now U.S. Pat. No. 6,029,934, copies of each of which are incorporated herein by reference in their entirety.

FIELD OF THE INVENTION

The present invention relates to the field of aircraft deicing, and more particularly, the present invention relates to an apparatus and method for deicing. aircraft using forced air from a compact, lightweight compressor unit.

BACKGROUND OF THE INVENTION

Some deicing systems and methods used for deicing snow and ice-covered aircraft surfaces use an apparatus that sprays large quantities of deicing fluids onto the aircraft surfaces. Typically, this has been accomplished by spraying a heated antifreeze fluid (e.g., a glycol and water mixture) onto the iced surfaces of the aircraft, together with a large quantity of compressed air. An example includes the system disclosed in U.S. Pat. No. 5,244,168, the disclosure of which is incorporated herein by reference in its entirety, where a nozzle mixes pressurized air and deicing fluid to provide a spray pattern for application to the aircraft to deice the aircraft.

Other systems separate the glycol and water mixture from the compressed air and include a separate nozzle for discharging compressed air by providing a forced air deicing system having a powerful compressed air source. Typically, these systems include a vehicle frame, such as the chassis of a truck, having a boom with one end mounted on the vehicle frame and a free end. An operator cab is positioned at the free end of the boom and a deicer air jet nozzle is connected at the free end of the boom, typically mounted on the operator cab for operator control.

Many of these systems use very powerful jet engine air start units. The air exits the nozzle at a temperature of 300 degrees F to 400 degrees F above ambient. As a result, some of the ice and snow is melted and can migrate into crevices on the aircraft. The aircraft acts as a heat sink because the large mass of the aircraft remains at subfreezing temperatures. Thus, sensitive sensors and critical trailing edge flaps may become frozen and ineffective.

Typically, this type of compressor is capable of 300 to 500 horsepower and provides 300 to 400 pounds per minute of compressed air. The units are very inefficient, producing unnecessary hot air and excessive noise. Additionally, these systems are very heavy and must be positioned near the vehicle frame, a long distance from the operator cab carrying an air jet nozzle. As a result, long tubes must extend from the vehicle frame along the boom to the operator cab where the nozzles are located. These long runs from the compressor can cause thermodynamic and pneumatic deficiencies.

Also, any system that injects fluid at high pressure into the air stream has a drawback because the fluid could act as a cutting medium and damage aircraft surfaces. Therefore, it is essential in some instances to keep a great distance from the aircraft to avoid damaging the aircraft with the high pressure fluid, thus making the forced air system ineffective.

Previous systems and methods for deicing aircraft have attempted to overcome many of the aforementioned problems. For example, Giroux, "Hot Air Blast System: An Alternative to Heated Glycol Deicing" (Jun. 12, 1997), which is incorporated herein by reference, discloses a system for removing accumulations of snow prior to deicing with heated glycol. The Giroux publication, however, does not teach or suggest a deicing system capable of using both hot air and limited quantities of deicing fluid. Moreover, Giroux does not teach or suggest using a compact, lightweight compressor unit and actually teaches away from using a turbocharger-based deicing system.

In addition, Allied Signal Aerospace, "Allied Signal's Augmented Forced-Air Deicing (AFAD)" (Oct. 22, 1996), which is incorporated herein by reference, discloses an Augmented Forced-Air Deicing system. The Allied Signal publication, however, does not teach or suggest using a compact, lightweight compressor unit. Moreover, the Allied Signal publication suggests a compressor unit mounted on a vehicle at the base of a deicing boom and actually teaches away from a compressor unit mounted proximate to an air jet nozzle.

Furthermore, Warnock, U.S. Pat. No. 4,423,980 (Jan. 3, 1984), which is incorporated herein by reference, discloses a truck-mounted apparatus for repairing asphalt. The Warnock patent, however, does not teach or suggest a system for deicing aircraft. More specifically, the Warnock patent does not suggest a deicing system having a compact, lightweight compressor unit mounted proximate to an air jet nozzle.

Peppard, U.S. Pat. No. 5,134,266 (Jul. 28, 1992), which is incorporated herein by reference, discloses a mobile deicing apparatus for melting accumulated ice from aircraft surfaces. The Peppard patent, however, does not teach or suggest a deicing system having a compact, light weight compressor unit mounted proximate to an air jet nozzle.

Moreover, Numbers et al., U.S. Pat. No. 6,250,588 (Jun. 26, 2001), which is incorporated herein by reference, discloses a forced air deicing and washing system attached to the distal end of a boom. Numbers was filed after the priority date of this application. Numbers does not teach or suggest a deicing system having a compact, light weight compressor unit with a high power-to-weight ratio, as disclosed in the present invention.

Accordingly, there is a significant need for a system and method for deicing that: (1) effectively removes ice and snow from critical equipment surfaces; (2) with improved efficiency by placing a lightweight air source proximate to the air nozzle; (3) with a high power-to-weight ratio; (4) at lower cost; and (5) while reducing the amount of hazardous and costly deicing fluids used.

Recently, Assignee's U.S. Pat. No. 6,045,092, to which the present application claims priority, was the subject of litigation. Opponents of the '092 patent argued that its scope was limited to a deicer system having a compressor unit mounted directly on the boom in the location shown in FIG. 1. Without prejudice to Assignee's rights, Assignee believes that the invention disclosed in the '092 patent is much broader than this narrow interpretation of the claims. Because of a concern that the claims of the '092 patent were unclear and might arguably be limited to a scope of protection that is less than that to which Assignee was entitled, Assignee disclaimed the claims of the '092 patent and filed the present application.

Although the '092 patent discloses, in a preferred embodiment, a deicing system having a compressor unit that can be mounted on a boom (see Col. 3, ll. 39–42), the placement of the compressor unit is not limited to this location in Assignee's priority documents. Rather, the language of the '092 patent and priority documents expressly distinguish over prior systems having large compressors located on the vehicle frame (see col. 4, ll. 13–18). As such, the '092 patent discloses a deicing system having a lightweight compressor unit located anywhere on the boom side of the bearing that attaches the boom to the vehicle frame. Numerous locations for the compressor unit on the boom side of the bearing, as well as other variations and modifications that fall within the scope of the '092 patent, will be apparent to persons of ordinary skill in the art. Thus, it is expressly intended that the present invention resolve any ambiguity regarding placement of the compressor and include these variations and modifications, provided they come within the scope of the appended claims and their equivalents.

SUMMARY OF THE INVENTION

It is therefore an object of the present invention to provide a system and method for deicing aircraft using a compact, lightweight air source that is not limited to being mounted on the vehicle frame.

It is another object of the present invention to provide a system and method for deicing aircraft using a compact, lightweight air source located proximate to a deicer air jet nozzle.

It is still another object of the present invention to provide an apparatus and method for deicing aircraft that uses forced air discharge that is efficient and uses a compressor unit that is lightweight, but generates an air discharge from a deicer air jet nozzle that is appropriate for deicing aircraft under frigid conditions, but also does not discharge at temperatures substantially above ambient temperature.

In accordance with the present invention, an apparatus and method for deicing aircraft now allows a compressor unit to be mounted on the vehicle boom by the use of a centrifugal compressor, such as the type of compressor commonly used when supercharging internal combustion engines. This type of compressor preferably is directly connected to a motor output, which in a preferred aspect of the invention is a hydraulic motor via a transmission, such as a belt, and in a preferred aspect, a drive gear unit. The centrifugal compressor includes an impeller and outlet as is normal with many of the superchargers used in automobile vehicle engines. The apparatus includes a vehicle frame and a boom having one end mounted on the vehicle frame and a free end. The compressor unit preferably is located proximate to the free end and a deicer air jet nozzle is connected at the free end of the boom and operatively coupled to the air outlet of the centrifugal compressor for receiving air and discharging the air for a deicer application.

A hydraulic pump preferably is mounted on the vehicle frame and hydraulic feed lines extend from the hydraulic pump along the boom to the hydraulic motor for supplying hydraulic fluid under pressure to the hydraulic motor. The vehicle frame can typically include a vehicle engine, such as normal with a truck. A transmission is driven from the vehicle engine and interconnects the hydraulic pump for supplying power to the hydraulic motor.

A drive gear unit is preferably operatively connected between the centrifugal compressor and the hydraulic motor for stepping up the revolutions per minute of the centrifugal compressor relative to the output of the hydraulic motor. The drive gear unit is preferably a single increasing gear set located within the compressor. Alternatively, the drive gear unit is a set of two increasing gear sets for stepping up the revolutions per minute of the centrifugal compressor relative to the output of the hydraulic motor. The deicer air jet nozzle defines an axisymmetric contour having a converging portion. An example of such an air jet nozzle is disclosed in U.S. Pat. No. 5,755,404, the disclosure of which is incorporated herein by reference in its entirety.

Typically, a fluid nozzle is mounted on the deicer air jet nozzle. A source of deicing fluid could be mounted at the vehicle frame and a supply tube interconnects the source of deicing fluid in the fluid nozzle. A pump is operatively connected to the source and supply tube and pumps deicing fluid from the source of deicing fluid through the supply tube and fluid nozzle. Typically, if an aircraft contains much ice, the deicing fluid would he placed on the ice to aid in melting the ice. A pump, such as, for example, a centrifugal pump, can typically inject deicing fluid into the air stream at 100 to 200 PSIG. Any greater pressure could create problems with aircraft damage.

As will be apparent to persons of ordinary skill in the art, a compressor unit of the type disclosed in a preferred embodiment of the present invention typically weighs in the range of about 75 to about 110 pounds. Moreover, the size of the compressor unit according to one embodiment of the present invention is typically in the range of about 9 cubic feet to about 11 cubic feet. Furthermore, the compressor unit of the present invention typically has a power-to-weight ratio in the range of about 0.8 to about 1.6 horsepower/pound.

A method aspect is also disclosed and includes the steps of compressing air within a centrifugal compressor located on a vehicle boom by driving a motor coupled to the centrifugal compressor and discharging the air from a deicer air jet nozzle attached to the end of the vehicle boom such that air is forced outward from the deicer air jet nozzle at about 100 pounds per minute.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now provides for an efficient apparatus and method for deicing aircraft without using expensive and powerful compressors and motors that must be positioned on a vehicle frame and far from any air nozzles. A deicer assembly of the present invention includes a centrifugal compressor and motor, which are preferably lightweight and can be located proximate to an operator cab positioned at the free end of the boom. The motor is preferably a hydraulic motor. The compressor and hydraulic motor can be placed on the bloom and/or at any position from the bearing between the boom and the vehicle frame to the air jet nozzle so that only hydraulic hoses from the hydraulic pump driven by a vehicle engine or separate auxiliary engine should be threaded or mounted along the boom, thus reducing the weight applied on the boom. Additionally, the use of the deicer air jet nozzle having an axisymmetric contour, such as disclosed in the above-identified and incorporated by reference '404 patent, allows the compressor to work in conjunction with the nozzle to provide a source of air at about 80 to 120 pounds per minute, which exits typically at no more than 15° to 30° F. above ambient in typical applications. Also, the pressure is discharged from about 13 to 14 PS1G, above atmospheric pressure.

Figure 1:
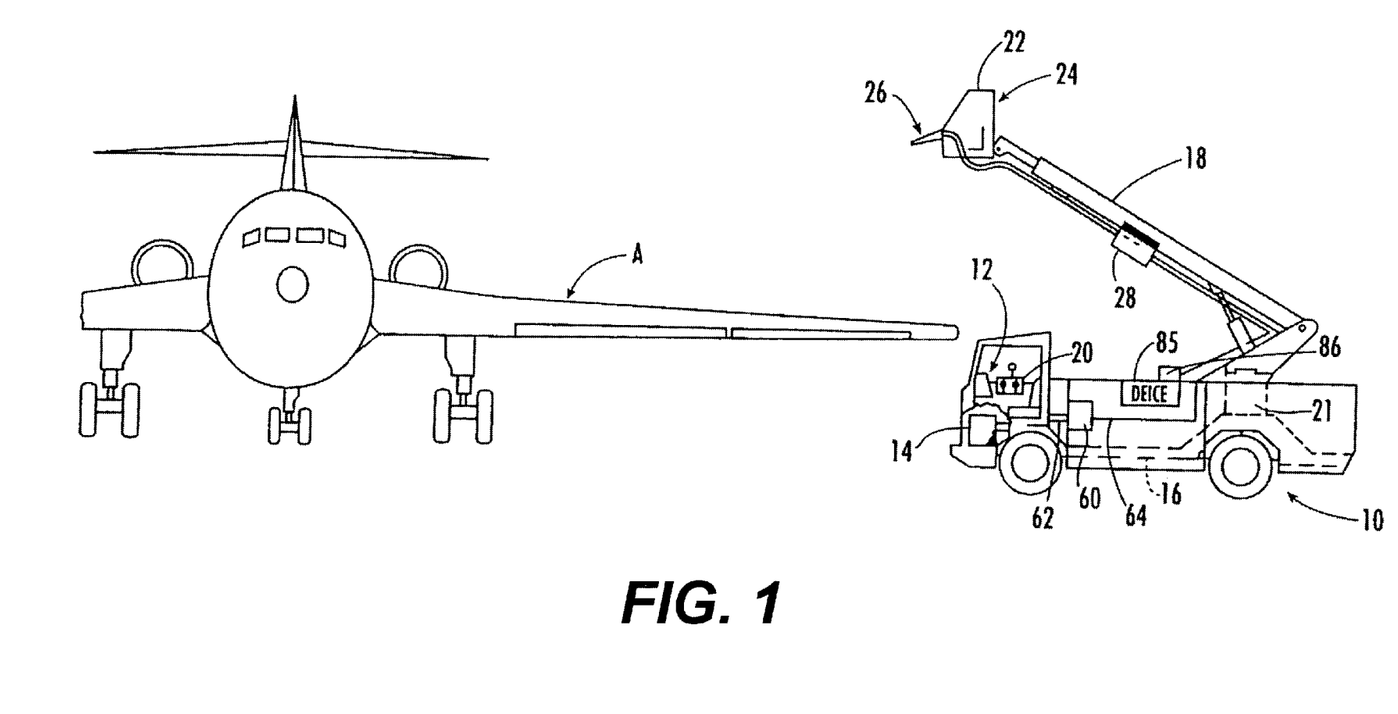
FIG. 1 illustrates a deicing apparatus according to a preferred embodiment of the present invention with a truck containing a boom and a deicer assembly positioned on the boom for providing compressed air to the deicer air jet nozzle that is mounted at an operator cab positioned at the free end of the boom.

Referring now to a preferred embodiment of the present invention illustrated in FIG. 1, there is illustrated a truck 10, which includes a vehicle cab 12 and vehicle engine 14 under the vehicle cab. The vehicle cab 12 and engine 14 are mounted on the vehicle frame 16. In the preferred embodiment of the present invention, a boom 18 has one end pivotally mounted on the vehicle frame 16 in such a manner to allow both vertical and circular movement of the boom.

Other embodiments of the boom 18 are considered within the scope of the present invention. For example, the boom 18 may be mounted to various other structures, including, but not limited to, a trailer or platform that might extend outward from the rear of the truck 10, a boom support member fixed to the ground, as disclosed in Assignee's U.S. patent application Ser. No. 09/454,979 entitled "System and Method for Deicing Aircraft Using Fixed Boom Support Member and Boom Mounted Compressor" and Assignee's U.S. patent application Ser. No. 09/455,031 entitled "System and Method for Deicing Aircraft Using Fixed Boom Support Member," copies of which are incorporated herein by reference, a passenger boarding bridge, as disclosed in Assignee's U.S. patent application Ser. No. 09/454,89 entitled "System for Deicing Aircraft Using Passenger Boarding Bridge With Bridge Mounted Compressor" and Assignee's U.S. patent application Ser. No. 09/454,363 entitled "System and Method for Deicing Aircraft Using Passenger Boarding Bridge With Boom Mounted Compressor," copies of which are incorporated herein by reference, and/or any other suitable location for providing the deicing system and method of the present invention, as described herein. Alternatively, as opposed to using a boom, the present invention may include a bridge crane and trolley apparatus, as disclosed in Assignee's U.S. patent application Ser. No. 09/460,167 entitled "Apparatus and Method for Deicing Aircraft Using Bridge Crane and Trolley," a copy of which is incorporated herein by reference.

In the preferred embodiment, a control panel 20 is located in the vehicle cab 12 and actuates the boom 18 by means of a corresponding hydraulic assembly 21 to move the boom in a desired vertical direction and turn the boom in the desired angular position. Naturally, the boom 18 could be located on a vehicle frame 16, such as a trailer or platform, that might extend outward from the rear of a large truck.

As shown further in FIG. 1, an operator cab 22 is positioned at the free end 24 of the boom. It is contemplated by the present inventors that the operator cab 22 may comprise an enclosed cab, a basket, a platform, and/or any other suitable means for allowing an operator to operate the deicing system of the present invention. In the preferred embodiment, an operator sits in the operator cab 22 to operate a deicer air jet nozzle 26, which in turn, is positioned at the free end of the boom, and typically at the end of the boom or directly on the operator cab. Other positions for the deicer air jet nozzle 26, including, but not limited to, various positions along the boom 18, and in the operator's hand, are considered well within the scope of the present invention. FIG. 1 also illustrates greater details of an air jet nozzle mounted on the end of the boom, as will be explained in detail below. A deicer assembly 28 is also mounted on the boom 18 and, in accordance with the present invention, is located proximate to the deicer air jet nozzle 26. By way of example and not by way of limitation, it is contemplated that the deicer assembly 28 may be located along the boom 18 (as shown in FIG. 1), at the free end of the boom 18, in the operator cab 22, under the operator cab 22, on top of the operator cab 22, in front of the operator cab 22, and/or at the deicer air jet nozzle 26. As will be apparent to those of ordinary skill in the art, numerous other locations for the deicer assembly 28 on the boom side of the bearing that attaches the boom 18 to the vehicle are considered to be within the scope of the present invention provided they are adapted to render the deicing system and method of the present invention, as described herein. Thus, the present invention is different from many prior art devices, where compressors and any large powerful motors driving any compressors were located on the vehicle frame due to the large and typically inefficient components used in these systems.

Figures 3A, 3B:
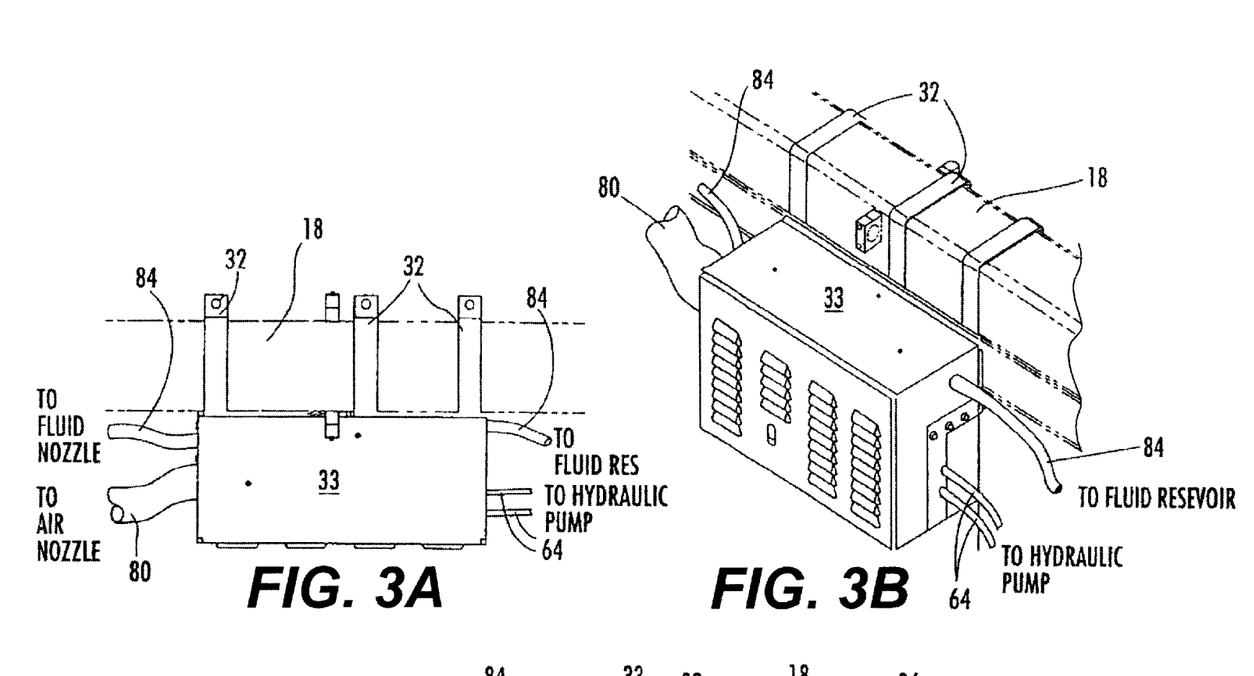
FIGS. 3A through 3C illustrate a deicer assembly according to a preferred embodiment of the present invention contained in a housing and mounted on the boom.
Figure 3C:
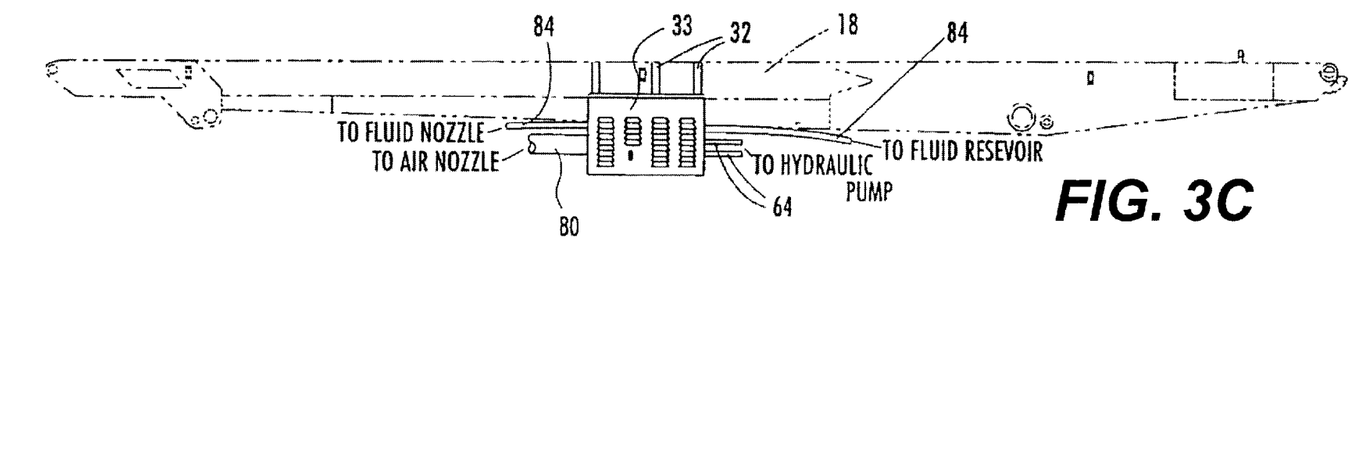
Figure 4:
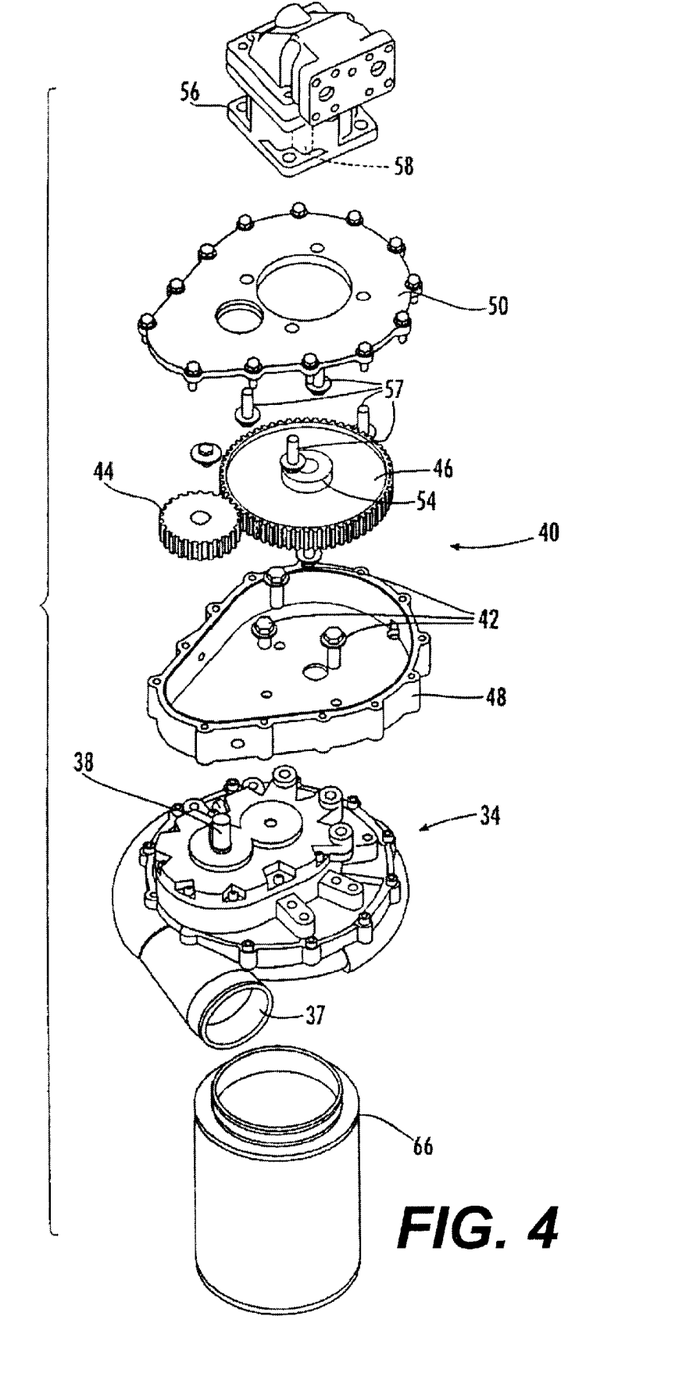
FIG. 4 is an exploded isometric view of a compressor unit according to one embodiment of the present invention and showing the hydraulic motor, centrifugal compressor and drive gear unit.
Figures 5, 6:
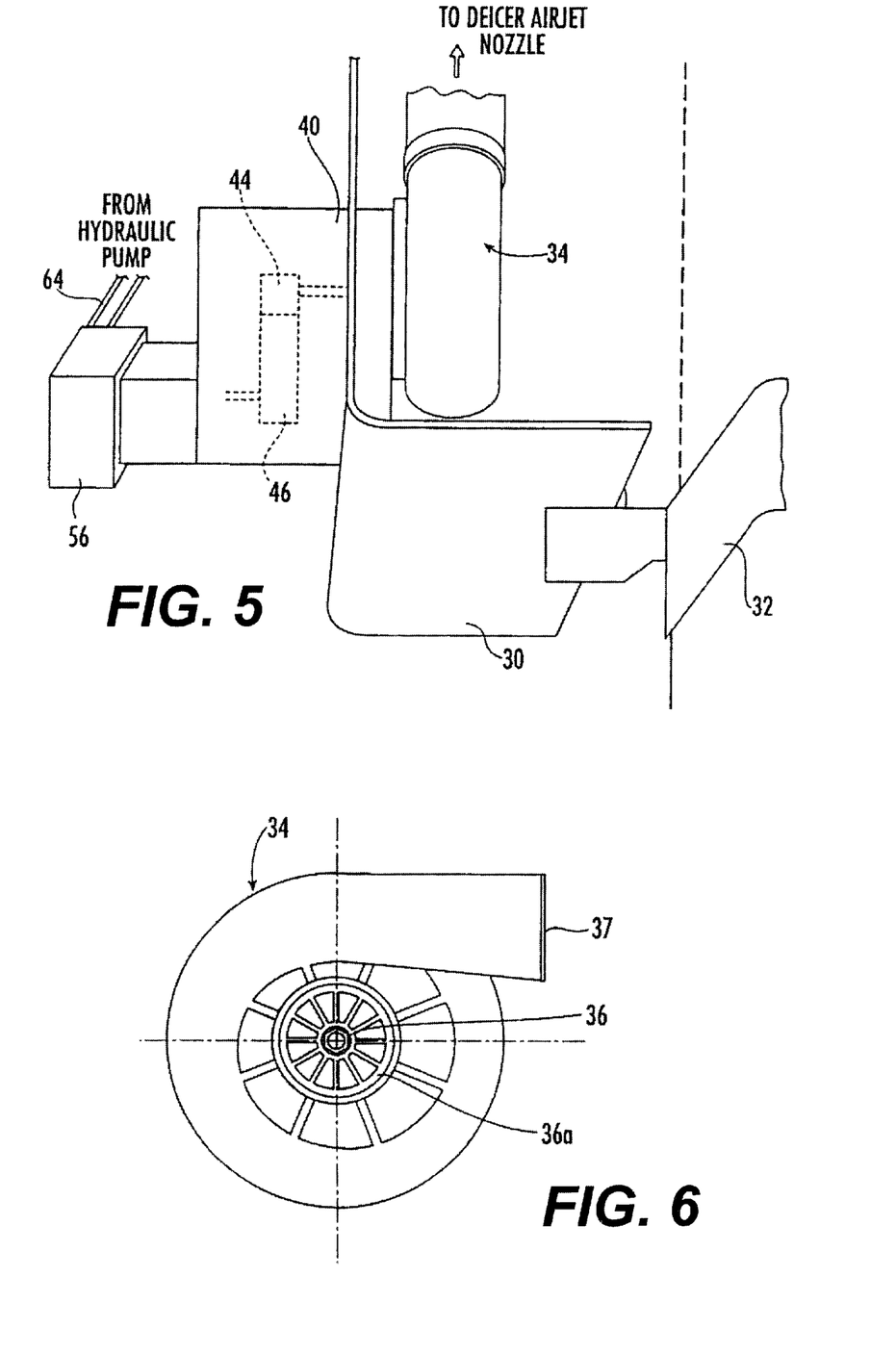
FIG. 5 is a schematic drawing showing the centrifugal compressor fixed to a compressor mounting frame and a mounting bracket that secures the compressor mounting frame to the boom of a vehicle according to a preferred embodiment of the present invention.
FIG. 6 is a schematic view of a centrifugal compressor according to a preferred embodiment of the present invention.

Referring now more particularly to FIGS. 4–6, details of the deicer assembly 28 are illustrated. A compressor mounting frame 30 has a mounting mechanism 32, in the form of brackets, positioned on the compressor mounting frame 30, which secure the compressor mounting frame 30 to the boom as shown in FIG. 5. The compressor mounting frame can be formed as a rigid L-shaped, metal support plate. The mounting brackets 32 can be formed as flexible metal straps (FIGS. 3A–3C). In one embodiment of the present invention, a centrifugal compressor 34 is fixed to the compressor mounting frame 30. As shown in FIGS. 4 and 6, the centrifugal compressor 34 is designed similar to the centrifugal compressors used as in supercharger systems on many automobiles. One design that has been found, efficient for the present invention is a centrifugal compressor used as a supercharger under the tradename 'V4X Supercharger' as manufactured by Vortech Engineering. Inc. of Channel Islands, Calif., and disclosed in greater detail in U.S. Pat. No. 5,224,459, the disclosure which is incorporated herein by reference in its entirety.

The centrifugal compressor 34 includes a rotating impeller 36 (FIG. 6) that is mounted on internal bearings (not shown) at the air intake 36a. The rotating impeller 36 includes an internal gear that is connected to another internal gear and power input shaft 38, such that the speed of the impeller can be increased by the internal gear ratio. Typically, the internal gears can be a helically designed set of gears with an aluminum, backward curved impeller 36. The compressor can typically produce an outlet air pressure of 29 PSIG, at 1700 cubic feet per minute flow rate.

As shown in FIG. 4, according to one embodiment of the present invention, a drive gear unit 40 is mounted on the centrifugal compressor by appropriate fasteners 42, such as bolts, as illustrated. The drive gear unit 40 includes an output spur gear 44 connected to the input shaft 38 of the centrifugal compressor 34. The output spur gear 44 is designed as a pinion gear that meshes with an input spur gear 46. Both the input and output spur gears 44, 46 are contained in a gear case box 48 having an appropriate gear case cover 50. A power shaft is connected on a hub 54 near the central portion of the larger input spur gear. The drive gear unit 40 aids in stepping up the revolutions per minute of the centrifugal compressor 34 relative to the output of the hydraulic motor 56. Alternatively, the drive gear unit 40 may be eliminated and the internal gear set of the centrifugal compressor 34 may solely be used to step up the revolutions per minute of the centrifugal compressor 34 relative to the output of the hydraulic motor 56. In either case, the output of the hydraulic motor 56 is increased at a ratio in the range of about 1:9 to about 1:10, and preferably at a ratio of about 1:9.76, to step up the revolutions per minute of the centrifugal compressor 34.

A hydraulic motor 56, such as a standard industrial hydraulic motor sold under the series F12 unit, manufactured by VOAC Hydraulics Division, S-461 82, Trollhatton, Sweden, of Parker Hydraulics, is mounted on the drive gear unit 40 via bolts 57 and has an output 58 that connects to the hub 54 located on input spur gear 46. The series F12 is a hydraulic motor that is a bent axis, fixed displacement heavy duty motor. It can be used for both open and closed loop applications. The motor has a unique spherical piston design and can typically run at high shaft speeds. It has operating pressures to 7000 psi, and provides for high output power capability. A 40° angle between shaft and cylinder barrel allows for a compact, lightweight motor. It is evident in FIG. 5 that the centrifugal compressor 34, drive gear unit 40 (if applicable) and hydraulic motor 56 form one complete compressor unit that may be secured by the compressor mounting frame 30 and mounting brackets 32 to the boom 18. Naturally, other motor designs could be used as long as the motor designs, whether electrical or hydraulic, meet the design parameters necessary for driving the compressor. In addition, as discussed above, the hydraulic motor 56 may be directly mounted to the compressor 34 without the intervening drive gear unit 40. Moreover, the compressor mounting frame 30, or similar structure, may be used to mount the compressor unit in alternative locations, such as, for example, at the free end of the boom 18, in the operator cab 22, under the operator cab 22, on top of the operator cab 22, in front of the operator cab 22, and/or at the deicer air jet nozzle 26, as discussed above.

In a preferred aspect of the present invention, a hydraulic pump 60 is mounted on the vehicle frame and typically operates by a cam or other transmission system 62 driven from the vehicle engine 14 or auxiliary engine. However, other locations and pump transmissions could be used depending on the vehicle design and type of components used in the present invention. Hydraulic lines 64 extend between the hydraulic pump 60 and the hydraulic motor 56 as shown in FIGS. 1 and 3A–3C, which provides the hydraulic fluid power necessary for driving the hydraulic motor. An air cleaner 66 is mounted at the impeller air intake area 68 of the centrifugal compressor to filter any air entering the centrifugal compressor.

Figure 2:
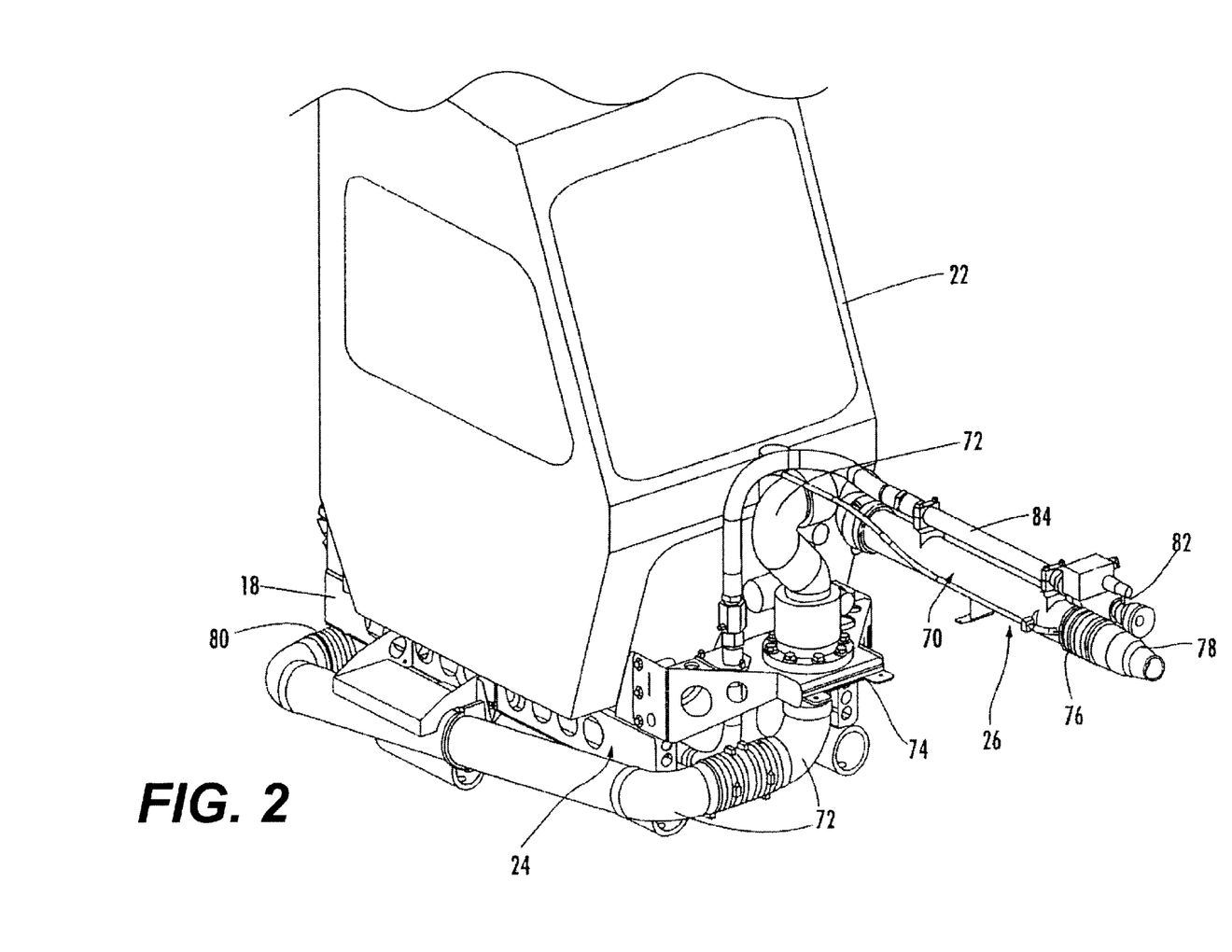
FIG. 2 is an enlarged isometric view of the operator cab and the deicer air jet nozzle and a fluid nozzle mounted at the operator cab at the free end of the boom according to a preferred embodiment of the present invention.

Referring now to FIG. 2, further details of the operator cab and the deicer air jet nozzle 26 are illustrated and described.

In one preferred aspect of the present invention, the deicer air jet nozzle 26 is the type of nozzle disclosed in the above-identified and incorporated by reference '404 patent. The nozzle 26 typically uses a tubular structure 70 having rigid conduit segments 72 and a stationary support 74. Typically, the nozzle includes an axisymmetric contour portion 76 and a converging portion 78 at the nozzle. An air supply tube 86 extends rearward to the air outlet 37 at the impeller 36 of the centrifugal compressor. As illustrated, a fluid nozzle 82 is positioned on the deicer air jet nozzle 26 and includes a fluid feed tube 84 that extends along the boom 18 to a reservoir of deicer fluid, illustrated generally at 85, typically formed from a glycol and water mixture. A centrifugal fluid pump 86 is operated by an operator in the operator cab to energize the pump and force fluid through the supply tube and through the fluid nozzle.

In operation, an operator in the operator cab can move the operator cab into a desired position and angle adjacent the aircraft. If a large amount of ice is located on a wing, the operator can energize the fluid pump 86 to pump fluid from the fluid reservoir 85 through the fluid nozzle 82 onto the wing of a airplane to provide initial deicing of any thick ice positioned on the wing. Preferably, no fluid is used, only a jet of air is discharged if no ice is present. Alter the glycol/water mixture has been placed onto the wing (if used), the operator energizes the hydraulic pump directly from the vehicle engine to drive the hydraulic motor and force the centrifugal compressor into operation by means of the hydraulic motor. About 80 to 120 pounds of air per minute are discharged through the deicer air jet nozzle at about 13 to 14 PSIG, and about 15° to 30° F. above ambient temperature with the use of the nozzle described above.

Naturally, the amount of air discharged through the deicer air jet nozzle 26 can vary depending on the end use needs. Because the centrifugal compressor 34 and the associated hydraulic motor and drive gear unit are positioned proximate to the deicer air jet nozzle, more efficient use is made of the compressor. Additionally, air with high pressure deicing fluid injected is not used as in some prior art systems, which under certain conditions, could create a cutting fluid. When injected fluid is needed, the injected deicing fluid used is at 100 to 200 PSIG pressure and cannot damage the aircraft. Also, an efficient use is made of a centrifugal compressor, drive gear unit and hydraulic motor, such that horsepower requirements for deicing are reduced. Thus, the centrifugal compressor and hydraulic motor can be mounted, for example, on the boom, as compared to many prior art devices where any air compressor and associated drive units were mounted on the vehicle frame.

The weight of the deicer assembly 28 according to one embodiment of the present invention is in the range of about 75 to about 110 pounds. Preferably, the deicer assembly 28 weighs approximately 100 pounds. Moreover, the size of the deicer assembly 28 according to one embodiment of the present invention is in the range of about 9 cubic feet to about 11 cubic feet. Preferably, the deicer assembly 28 is approximately 10 cubic feet in size. As discussed above, the deicer assembly 28 includes the centrifugal compressor 34, the drive gear unit 40 (if applicable), and the hydraulic motor 56. As will be apparent to those of ordinary skill in the art, the deicer assembly 28 may further comprise other components, such as, but not limited to, a lubrication system (including components such as, for example, a pump, a cooler, an oil tank, and/or an electrical system), a housing, and/or any other components necessary to enable the deicer assembly 28 to provide forced air deicing according to the present invention.

In addition, the hydraulic motor 56 according to one embodiment of the present invention is capable of generating an output in the range of about 90hp to about 120 hp at about 5,000 rpm. In the preferred embodiment, the hydraulic motor 56 generates about 95 hp at about 4,650 rpm. The hydraulic motor 56 enables the impeller 36 of the compressor 34 to rotate at about 45,000 rpm.

Figure 7:
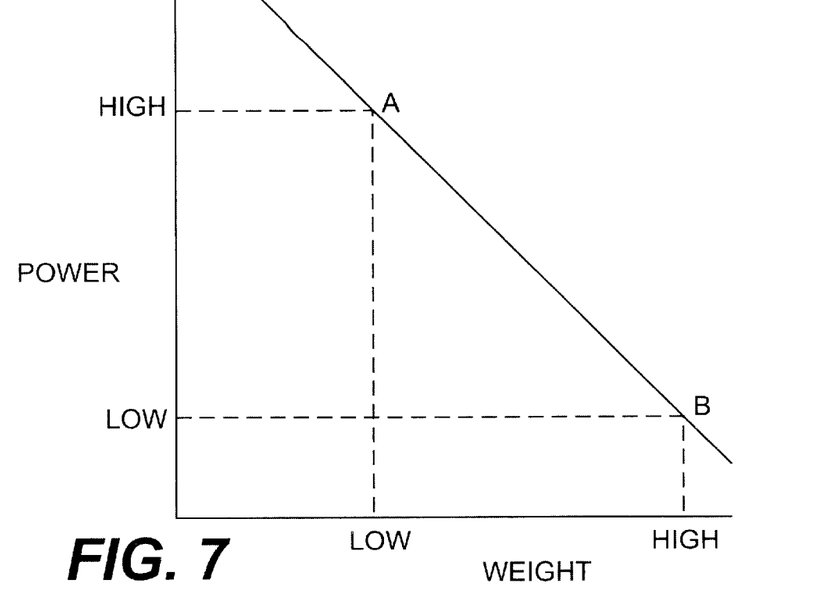
FIG. 7 is a graph illustrating a comparison between power-to-weight ratios according to a preferred embodiment of the present invention and prior known deicing systems.

The deicer assembly 28 of the present invention is an improvement over many known deicing systems because it has a high power-to-weight ratio. FIG. 7 is a graph illustrating a comparison between power-to-weight ratios according to a preferred embodiment of the present invention and prior deicing systems. As illustrated by the area marked "A" in FIG. 7, the deicer assembly 28 of the present invention provides high power despite a relatively low weight. In one embodiment of the present invention, the deicer assembly 28 has a power-to-weight ratio in the range of about 0.8 to about 1.6 horsepower/pound. Preferably, the deicer assembly 28 has a power-to-weight ratio of about 0.95. In contrast, many known deicing systems, such as those that use industrial positive displacement compressors, aircraft cabin pressurization units, and jet engine air start compressors, provide significantly less power than the present invention and weigh significantly more. These systems generally, have power-to-weight ratios as illustrated by the area "B" in FIG. 7. It is to be understood that FIG. 7 is for exemplary purposes only, and, as will be apparent to those of ordinary skill in the art, actual values may vary depending on a variety of factors, such as, for example, the specifications of the compressor and the manner in which the power is measured.

According to one embodiment of the present invention, the hydraulic motor 56 is capable of storage in ambient from between approximately −40 degrees F. to approximately 140 degrees F. and is capable of operation from approximately −20 degrees F. to approximately 120 degrees F. In addition, the hydraulic motor 56 is capable of operation with hydraulic fluid at approximately −20 degrees F. to approximately 200 degrees F. In the preferred embodiment of the present invention, the hydraulic motor 56 operates with Mobil DTE 11M hydraulic fluid. Other commercially available hydraulic fluids, however, are considered well within the scope of the present invention.

The use of the lightweight, compact deicer assembly 28 creates several advantages over preexisting deicing systems. The use of the hydraulic motor 56 eliminates the need for many system components, creating a simpler, cheaper, more reliable deicing system.

Figure 8:
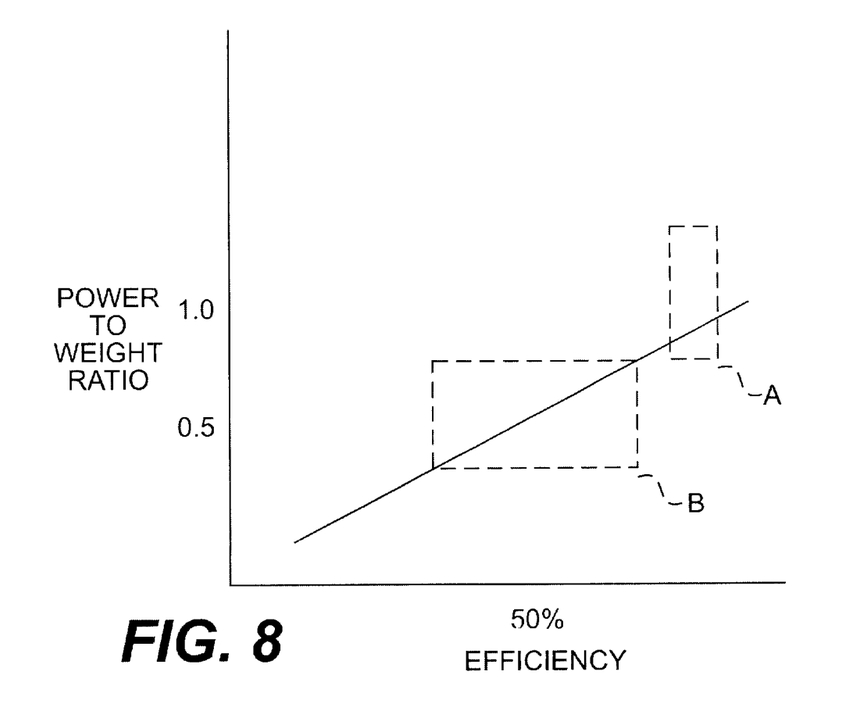
FIG. 8 is a graph of power to weight ratio as a function of efficiency of a preferred embodiment of the present invention and prior known deicing systems.
Figure 9:
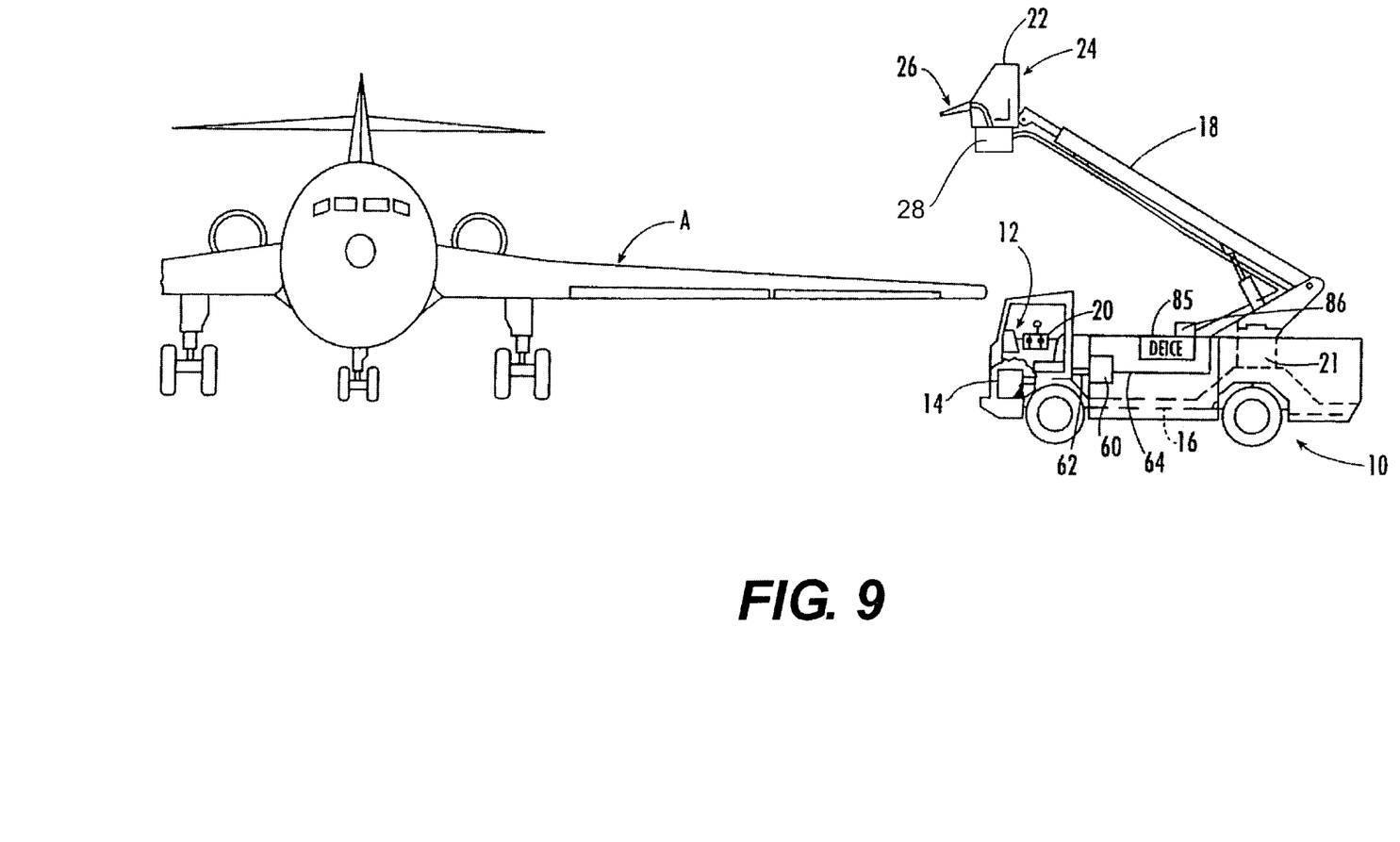
FIG. 9 illustrates a deicer apparatus according to an embodiment of the present invention.
Figure 10:
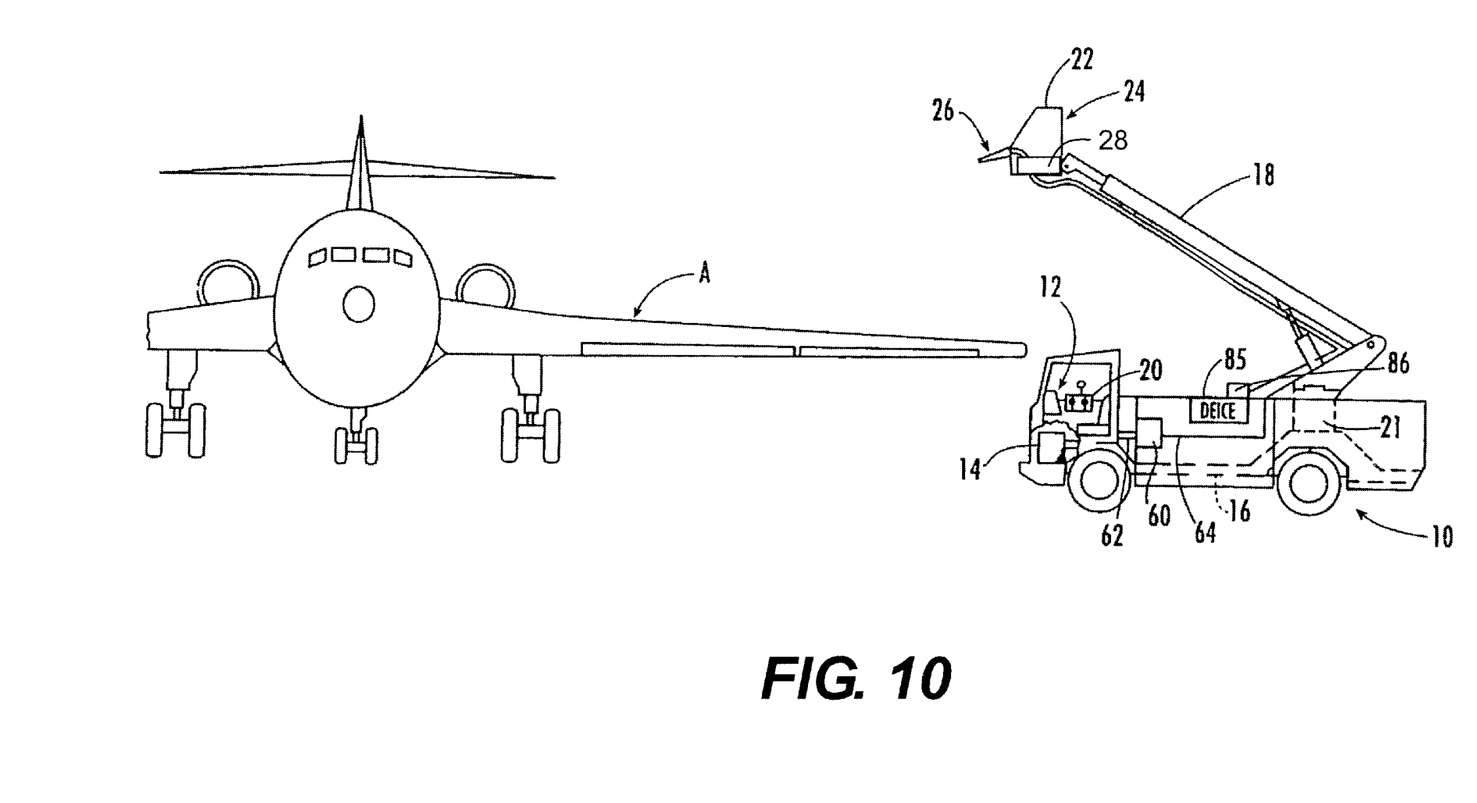
FIG. 10 illustrates a deicer apparatus according to another embodiment of the present invention.

Moreover, the reduction in the number of components in the deicer assembly 28 creates a smaller, lighter compressor unit than those provided by preexisting deicing systems. For example, the compressor and drive unit used in Allied Signal's Premier Hybrid Deicing System, to the present inventor's knowledge, weighs significantly more than 100 pounds, and may weigh as much as 150 pounds. In contrast, the deicer assembly 28 according to the preferred embodiment of the present invention is substantially smaller and weighs substantially less. This enables the deicer assembly 28 to be mounted closer to the air jet nozzle 26, for example, at the free end of the boom 18, in, on, under, or on top of the operator cab 22, or at the air jet nozzle 26. This location is advantageous because it leads to improvements in hydraulic and thermodynamic efficiencies. In contrast to many known deicing systems which may have efficiencies of approximately 70% or less, the efficiency of the deicing system according to the present invention is in the range of about 80% to about 85%. FIG. 8 is a graph of power-to-weight ratio as a function of efficiency for a preferred embodiment of the present invention and prior deicing systems. As illustrated by the area marked "A" in FIG. 8, the deicer assembly 28 of the present invention provides a high power to weight ratio, and accordingly, improved efficiency. In contrast, many known deicing systems, provide low power to weight ratios, and correspondingly poor efficiency, as illustrated by the area "B" in FIG. 8. It is to be understood that FIG. 8 is for exemplary purposes only, and, as will be apparent to those of ordinary skill in the art, actual values may vary depending on a variety of factors.

Furthermore, the placement of the deicer assembly 28 proximate to the air jet nozzle 26 creates still more cost savings because it eliminates the need for other system components, such as air ducting from the air outlet of the compressor 34 to the air jet nozzle 26, an extensive boom structure, which is necessary for the heavy compressor units found in many preexisting deicing systems, and counterweights placed on the truck 10.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A system for deicing, comprising:
   a vehicle frame;
   a boom having an end mounted on said vehicle frame and a free end;
   a lightweight air source disposed on said boom; and
   a deicer air jet nozzle located at said boom and operatively coupled to said air source for receiving air and discharging the air for a deicer application.

2. The system according to claim 1, wherein said lightweight air source is a compressor unit comprising:
   a hydraulic drive assembly having an output; and
   a compressor operatively connected to the output of said hydraulic drive assembly, said compressor having an impeller and an air outlet.

3. The system according to claim 2, wherein said hydraulic drive assembly is a hydraulic motor.

4. The system according to claim 2, wherein said compressor is a centrifugal compressor.

5. The system according to claim 2, wherein said compressor is operatively connected to the output of said hydraulic drive assembly without an intervening drive gear assembly.

6. The system according to claim 1, wherein the weight of said air source is less than or equal to about 100 pounds.

7. The system according to claim 1, wherein the weight of said air source is in the range of about 75 pounds to about 110 pounds.

8. The system according to claim 1, wherein the weight of said air source is about 100 pounds.

9. The system according to claim 1, wherein the size of said air source is less than about 10 cubic feet.

10. The system according to claim 1, wherein the size of said air source is in the range of about 9 cubic feet to about 11 cubic feet.

11. The system according to claim 1, wherein the size of said air source is about 10 cubic feet.

12. The system according to claim 2, wherein said compressor provides air through said deicer air jet nozzle at a rate in the range of about 80 pounds per minute to about 120 pounds per minute.

13. The system according to claim 2, wherein said compressor provides air through said deicer air jet nozzle at a rate of about 100 pounds per minute.

14. The system according to claim 2, wherein said hydraulic drive assembly has an output in the range of about 90 horsepower to about 120 horsepower at about 5,000 rpm.

15. The system according to claim 1, wherein the efficiency of said air source is greater than about 80%.

16. The system according to claim 2, wherein said compressor unit has a power to weight ratio in the range of about 0.8 horsepower per pound to about 1.6 horsepower per pound.

17. The system according to claim 1, wherein said air source is located proximate to said deicer air jet nozzle.

18. A system for deicing aircraft, comprising:
a vehicle frame;
a boom having a first end pivotally mounted on said vehicle frame and a free end;
a lightweight compressor unit disposed above the first end of said boom,
wherein the weight of said compressor unit is less than or equal to about 100 pounds; and
a deicer air jet nozzle located at the boom and operatively coupled to said lightweight compressor unit for receiving air and discharging the air for a deicer application.

19. The system according to claim 18, wherein said compressor unit further comprises:
a hydraulic drive assembly having an output; and
a compressor operatively connected to the output of said high-speed drive assembly, said compressor having an impeller and an air outlet.

20. The system according to claim 18, wherein the size of said compressor unit is approximately 10 cubic feet.

21. The system according to claim 18, wherein said compressor unit has a power to weight ratio in the range of about 0.8 horsepower per pound to about 1.6 horsepower per pound.

22. The system according to claim 19, wherein said compressor is operatively connected to the output of said hydraulic drive assembly without an intervening drive gear assembly.

23. A system for deicing aircraft, comprising:
a vehicle frame;
a boom having an end mounted on said vehicle frame and a free end;
an operator cab located at the free end of said boom;
a lightweight compressor unit disposed on said operator cab; and
a deicer air jet nozzle located at said boom and operatively coupled to the air outlet of said compressor for receiving air and discharging the air for a deicer application.

24. The system according to claim 23, wherein said compressor unit further comprises:
a hydraulic drive assembly having an output; and
a compressor operatively connected to the output of said hydraulic drive assembly, said compressor having an impeller and an air outlet.

25. The system according to claim 24, wherein said compressor is operatively connected to the output of said hydraulic drive assembly without an intervening drive gear assembly.

26. A system for deicing aircraft, comprising:
a vehicle frame;
a boom, having an end mounted on the vehicle frame and a free end;
a compressor unit, said compressor unit comprising:
a hydraulic motor having an output, and
a compressor operatively connected to the output of said hydraulic motor, said compressor having an impeller and an air outlet; and
a deicer air jet nozzle located at the boom and operatively coupled to the air outlet of the compressor for receiving air and discharging the air for a deicer application,
wherein said compressor unit is located proximate to said deicer air jet nozzle.

27. A method for deicing aircraft, comprising the steps of:
compressing air within a compressor supported by a vehicle boom by driving a hydraulic drive assembly coupled to the compressor; and
discharging the air from a deicer air jet nozzle attached to the end of the vehicle boom such that air is forced outward from the deicer air jet nozzle at about 100 pounds per minute,
wherein the combined weight of the compressor and the hydraulic drive assembly is less than or equal to about 100 pounds.

28. A system for deicing aircraft, comprising:
a vehicle frame;
a boom having an end mounted on said vehicle frame and a free end;
an operator cab located at the free end of said boom; and
a lightweight compressor unit located proximate to a deicer air jet nozzle,
wherein said deicer air jet nozzle is located at said boom and operatively coupled to the air outlet of said compressor for receiving air and discharging the air for a deicer application.

29. The system according to claim 28, wherein said compressor unit further comprises:
a hydraulic drive assembly having an output; and
a compressor operatively connected to the output of said hydraulic drive assembly, said compressor having an impeller and an air outlet.

30. The system according to claim 29, wherein said compressor is operatively connected to the output of said hydraulic drive assembly without an intervening drive gear assembly.

* * * * *